(12) United States Patent
Boon et al.

(10) Patent No.: US 7,383,548 B2
(45) Date of Patent: Jun. 3, 2008

(54) CPU USAGE REGULATION

(75) Inventors: Gary K. Boon, Manotick (CA); Keith Dysart, Stittsville (CA); Greg Waines, Kanata (CA); Mark Dapoz, Kanata (CA); France Tremblay, Kanata (CA)

(73) Assignee: Nortel Networks Limited (CA)

( * ) Notice: Subject to any disclaimer, the term of this patent is extended or adjusted under 35 U.S.C. 154(b) by 945 days.

(21) Appl. No.: 10/722,480

(22) Filed: Nov. 28, 2003

(65) Prior Publication Data

US 2005/0120104 A1 Jun. 2, 2005

(51) Int. Cl.
*G06F 9/46* (2006.01)
(52) U.S. Cl. ............... 718/102; 718/100; 718/103; 718/104; 718/105
(58) Field of Classification Search ......... 718/100–107
See application file for complete search history.

(56) References Cited

U.S. PATENT DOCUMENTS 6,223,201 B1 * 4/2001 Reznak .................. 718/102
6,263,359 B1 * 7/2001 Fong et al. ............. 718/103

OTHER PUBLICATIONS

Carl A. Waldspurger & William E. Weihl, Stride Scheduling: Deterministic Proportional-Share Resource Management, Technical Memorandum MIT/LCS/TM-528 MIT Laboratory for Computer Science, Cambridge, MA 02139, Jun. 22, 1995.
Carl A. Waldspurger, Lottery and Stride Scheduling: Flexible Proportional-Share Resource Management, Department of Electrical Engineering and Computer Science, Massachusetts Institute of Technology, Sep. 1995.

* cited by examiner

*Primary Examiner*—Lewis A. Bullock, Jr.
*Assistant Examiner*—Kenneth Tang
(74) *Attorney, Agent, or Firm*—Anderson Gorecki & Manaras LLP

(57) ABSTRACT

A scheduler of central processing unit (CPU) usage arranges tasks in a plurality of classes, associating a given task with a top level class and a sub-class. Weights may be associated with sub-classes and usage targets associated with top level classes. A target CPU usage may then be determined for the given task from a weight and a target CPU usage. Once an actual usage of the CPU by the given task is determined in a first predetermined evaluation interval, a penalty duration may be determined for the given task based on the actual usage and the target CPU usage. A penalty may then be applied to the given task for the penalty duration during a second predetermined evaluation interval.

20 Claims, 7 Drawing Sheets

CPU USAGE REGULATION

FIELD OF THE INVENTION

The present invention relates to operation systems kernels and, more particularly, to regulation, by the kernel, of usage of a central processing unit.

BACKGROUND

A kernel is the essential center of a computer operating system, the core that provides basic services for all other parts of the operating system. A kernel can be contrasted with a shell, the outermost part of an operating system that interacts with user commands.

Typically, a kernel (or any comparable center of an operating system) comprises programming code that runs on a central processing unit (CPU) and includes an interrupt handler that handles all requests or completed input/output (I/O) operations that compete for the kernel's services, a scheduler that determines which programs use the kernel processing time and an order of use, and a supervisor that allows usage of the CPU to each task when the task is scheduled. A kernel may also include a manager of the operating system address spaces in memory or storage, sharing the address spaces among all components and other users of the services of the kernel. The services of a kernel may be requested by other parts of the operating system, or by applications, through a specified set of program interfaces sometimes known as system calls.

Most modern real-time kernels provide a preemptive, priority-based scheduling algorithm. With a preemptive, priority-based scheduling algorithm, each task has a priority and the kernel insures that CPU usage is allocated to the highest priority task that is ready to run. This scheduling algorithm is preemptive in that, if a task that has a higher priority than the current task becomes ready to run, the kernel immediately saves the context of the current task and switches to the context of the higher priority task. The priority of a given task may be chosen to reflect both the urgency and the importance of the given task within a processing system. Although it is possible to change the priority of the task after initial creation, many processing systems choose to use static task priority assignments, which are unlikely to reflect the processing system's changing CPU load and demand.

In a complex and busy real-time system, demand for CPU usage is often in excess of 100%. When this occurs, some (high priority) tasks may dominate usage of the CPU, while some (low priority) tasks are starved, i.e., receive no usage of the CPU. It has been recognized for some time that a scheduling model different from static task priority assignment would be beneficial to modern systems. One solution to the problem of starved low priority tasks is to reassign the priority of a starved low-priority task that is required to receive some usage of the CPU. Such a reassignment shuffles one or more of the tasks previously dominating usage of the CPU down a list of tasks organized by priority. However, such shuffling of the static task priorities often fails to solve the problem, in that a new set of tasks may be starved for CPU usage. Finding an ideal hierarchy of task priorities is fundamentally difficult in a complex system and is often impossible in a system where the demands are diverse over time.

Some alternative systems have employed dynamic adjustment of task priorities wherein task priorities are adjusted over time to accommodate the changing demands of the system.

In a system employing "Normal Proportional Share Scheduling", tasks are guaranteed a percentage of the task level CPU usage, relative to each other. Only one task is allowed to run at any given time. A scheduling algorithm chooses a task to run, and the chosen task runs with a frequency or duration (depending upon the algorithm) in proportion to the percentage guaranteed to the chosen task.

The Normal Proportional Share Scheduling model may be seen to be too static, to lack respect for changing needs and to lack the ability to accommodate urgent demands. Latency, a delay before a given task is provided with an opportunity to run, may be seen to become an issue, even in underload conditions. Furthermore, the Normal Proportional Share Scheduling model manages the system even when the system does not require managing, i.e., when demand for CPU usage is less than 100%.

A model called "Inverse Proportional Share Scheduling" is a derivative of Normal Proportional Share Scheduling. Unlike Normal Proportional Share Scheduling, which attempts to avoid starvation by guaranteeing CPU usage to each task, Inverse Proportional Share Scheduling limits the CPU usage of each task. Tasks take turns serving a penalty (i.e., being prevented from running). The length of the penalty associated with a given task is proportional to the penalties of the other participating tasks.

Like Normal Proportional Share Scheduling, the Inverse Proportional Share Scheduling model may be seen to be too static, to lack respect for changing needs and to lack the ability to accommodate urgent demands. Latency may be seen to become an issue, even in underload conditions, and the Inverse Proportional Share Scheduling model manages the system even when the system does not require managing.

In a pure application-based solution, the system relies upon applications to develop their own solutions to scheduling problems, employing their own custom algorithms. However, such a solution relies upon the "good nature" of the applications, which may not be wise. Additionally, a single, system-wide solution may be seen to be more efficient and cost effective than multiple, application-based solutions.

In an approach based on the pure application-based solution, but with the addition of kernel assistance, a given application may regularly signal to the scheduler that the given application may give up the CPU at that moment, without interrupting critical work. A set of primitives may be provided by the kernel to facilitate such signaling. The given application has incentive to provide these regular signals, as the signals provide the scheduler with an ability to avoid interrupting the given application at an inconvenient time.

Such an approach, while similar to the pure application-based solution, relies upon primitives and measurements provided by the kernel to ensure correct execution. The approach has an advantage over the pure application-based solution in that some part of the solution is shared by the system, reducing the overhead to the system. However, the approach still relies upon the good nature of the applications.

In so-called "Modal" solutions, when the demand for the CPU grows beyond 100%, the system switches from one scheduling mode to another scheduling mode. For example, the system could switch from purely static, priority-based scheduling, a model which favors urgency, to Normal Proportional Share Scheduling, which favors importance in an overload situation. In this sense, each task has two priorities, one for urgency and one for importance.

Unfortunately, it has been found that modal solutions fail to work very well due to a difficulty in identifying the overload prioritization. The set of priorities for the overloaded state depends upon the cause of the overload condition. Anything that causes CPU demand in excess of 100% for an extended period of time could be considered to be causing overload. To be effective, a prioritization must be defined for each possible cause of overload, and each of their permutations. For systems wherein the number of possible overload causes is large, such prioritization definition becomes unmanageable.

Another approach calls for "call back registration" for dealing with timer extend requirements. Typically, several applications deal with situations wherein a client is waiting for a response. Often the application never receives sufficient CPU time to generate a response to the client and the client times out. The approach offers a scheduler a low cost mechanism to inform a given application that:

a) it is recognized that you haven't received CPU time for X time-units;
b) it is recognized that that your client is about to timeout;
c) you are about to receive some CPU time; and
d) this is your opportunity to request that your client extend its timeout.

However, while this approach may work with applications of the type that act as servers, this approach may not work with applications of the type for which only the final result is appropriate for the client. For applications of the latter type, if the application is to be allocated CPU usage, it may be preferred that the application use the allocated CPU usage to work on the final result, rather than forming a request to extend a timeout.

In a "Strictly Constrained Ordered Scheduling" approach, the scheduler is pre-programmed with a fixed task scheduling order for a particular environment. Since the approach relies upon a priori knowledge of the system, this approach is generally used for a small subset of systems, including hard real-time systems such as engine management, and is not broadly applicable.

A "Deadline Driven" scheduling model requires that task priorities be dynamically computed and adjusted to meet hard deadlines. Although a variety of methods are employed to compute task priorities from a set of deadlines, the earliest-deadline-first algorithm is common. In this scheduling model, the task with the earliest deadline has the highest priority and the task with the latest deadline has the lowest priority. This scheduling model relies upon a priori knowledge about the deadlines of each task in the system. While all scheduling models depend upon some a priori knowledge to some extent, deadline driven models require a greater understanding of the demands of a system and are typically only useful in hard real-time systems.

Clearly, a new scheduling model is required that addresses shortcomings of existing scheduling models.

SUMMARY

A unique method of dynamically adjusting task priorities to balance the needs of a system needs within a dynamic environment offers versatility and high accuracy with minimal risk to the system. In particular, the actual CPU usage of each task of a plurality of tasks may be monitored and compared against a determined "target" CPU usage associated with each task. To facilitate the determination of an appropriate target, the tasks may be organized into top level classes and sub-classes. As the actual CPU usage exceeds the determined target CPU usage, the task may be assessed a "penalty". The penalty, which may be served as a percentage of some time interval, may also change dynamically until the CPU usage over time converges upon the target CPU usage.

In accordance with an aspect of the present invention there is provided a method of scheduling central processing unit (CPU) usage by a given task. The method includes associating the given task with a top level class and a sub-class and determining a target CPU usage for the given task from a weight associated with the sub-class and a target CPU usage associated with the top level class. In other aspects of the present invention, an apparatus is provided for carrying out this method and a computer readable medium is provided to allow the method to be performed by a general purpose computer.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

In overview, tasks that abuse CPU consumption in a real-time system are penalized so that starvation for CPU usage by other tasks can be prevented. In an approach in which each task is treated independently, each task is assigned a target CPU usage percentage, which is a percentage of the total available CPU usage. However, rather than treating each task independently, the tasks may be grouped into classes. Target CPU usage then applies to a class of tasks, rather than to individual tasks.

Figure 1:
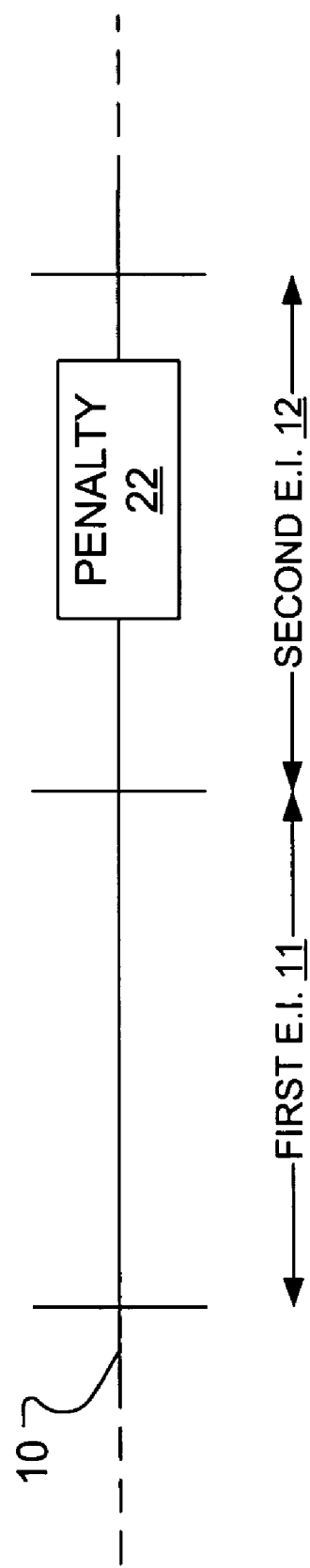
FIG. 1 illustrates a time line wherein a penalty is applied during a second evaluation interval.

FIG. 1 illustrates a time line 10 divided into a first evaluation interval 11 and a second evaluation interval 12. By way of example, each evaluation interval may last one second.

In operation, an actual usage of the CPU by a given task is determined for the first evaluation interval 11. The actual CPU usage measured for the given task is compared against the absolute target CPU usage associated with the given task. If the actual CPU usage is greater than the absolute target CPU usage, then a penalty duration may be determined for the given task. A penalty may then be applied to the given task for the determined penalty duration 22 during the second evaluation interval 12. The penalty duration may, initially, be proportional to the difference between the actual CPU usage and the absolute target CPU usage. The penalty duration defines a length of time during the next evaluation interval during which a penalty will be applied to the given task. A variety of mechanisms may be employed to apply a penalty to the given task. For example, the given task may receive a demotion to a lower scheduling priority during the penalty duration.

To accurately measure the actual CPU usage, code may be added to the "task switch hooks" provided by the operating system. Such task switch hooks are executed whenever a transition occurs from one task to another. Alternatively or additionally, code may be placed into interrupt stubs (i.e., the entry and exit points of the interrupt routines). Such code may allow the monitoring of situations wherein interrupt level processing deprived a running task of CPU time. Notably, the added code may be configured to measure only the CPU usage for tasks for which CPU usage regulation is desired.

For use in determining the penalty duration, the target CPU usage percentage may be translated into an absolute target CPU usage. If, for instance, each evaluation interval has a duration of one second, a target CPU usage percentage of 25% may be translated into an absolute target CPU usage of 250,000 microseconds.

After the second evaluation interval 12, the penalty duration may be re-assessed.

In re-assessing the penalty, the actual usage of the CPU by the given task is determined for the second evaluation interval 12. The penalty duration may then be altered in proportion to the difference between the actual CPU usage and absolute target CPU usage. Note that second determination of the actual CPU usage is determined for the second evaluation interval 12 and is not a cumulative total of the actual CPU usage for all evaluation intervals.

Figure 2:
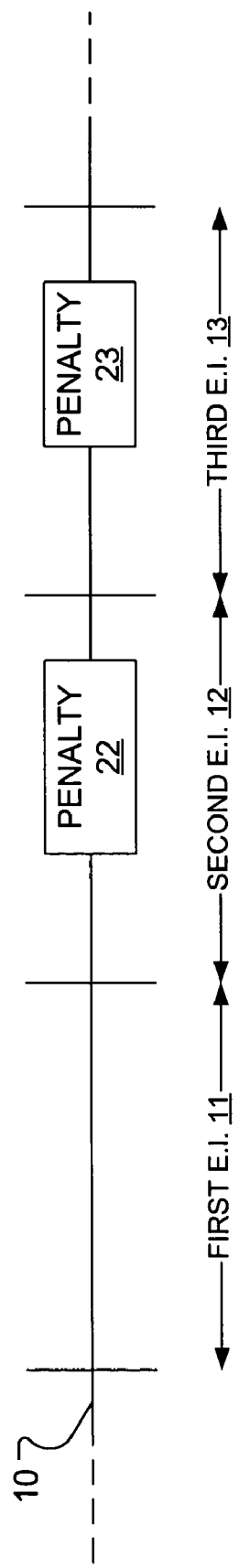
FIG. 2 illustrates the time line of FIG. 1 wherein another penalty is applied during a third evaluation interval.

FIG. 2 illustrates the time line 10 of FIG. 1 wherein a third evaluation interval 13 is additionally illustrated. The third evaluation interval 13 includes a new penalty duration 23 during which the penalty may be applied to the given task. Most likely due to the penalty applied to the given task, it may be seen that the difference between the actual CPU usage and absolute target CPU usage has diminished. Accordingly, the penalty duration may also be diminished such that the new penalty duration 23 is shorter than the original penalty duration 22.

While serving a penalty, the given task is running at a much lower priority and, hence, is not interfering substantially with the operation of the system. CPU usage received by the given task during the penalty duration is considered beneficial. Consequently, the CPU usage accrued while serving a penalty is not used in determining the actual CPU usage.

Figure 3:
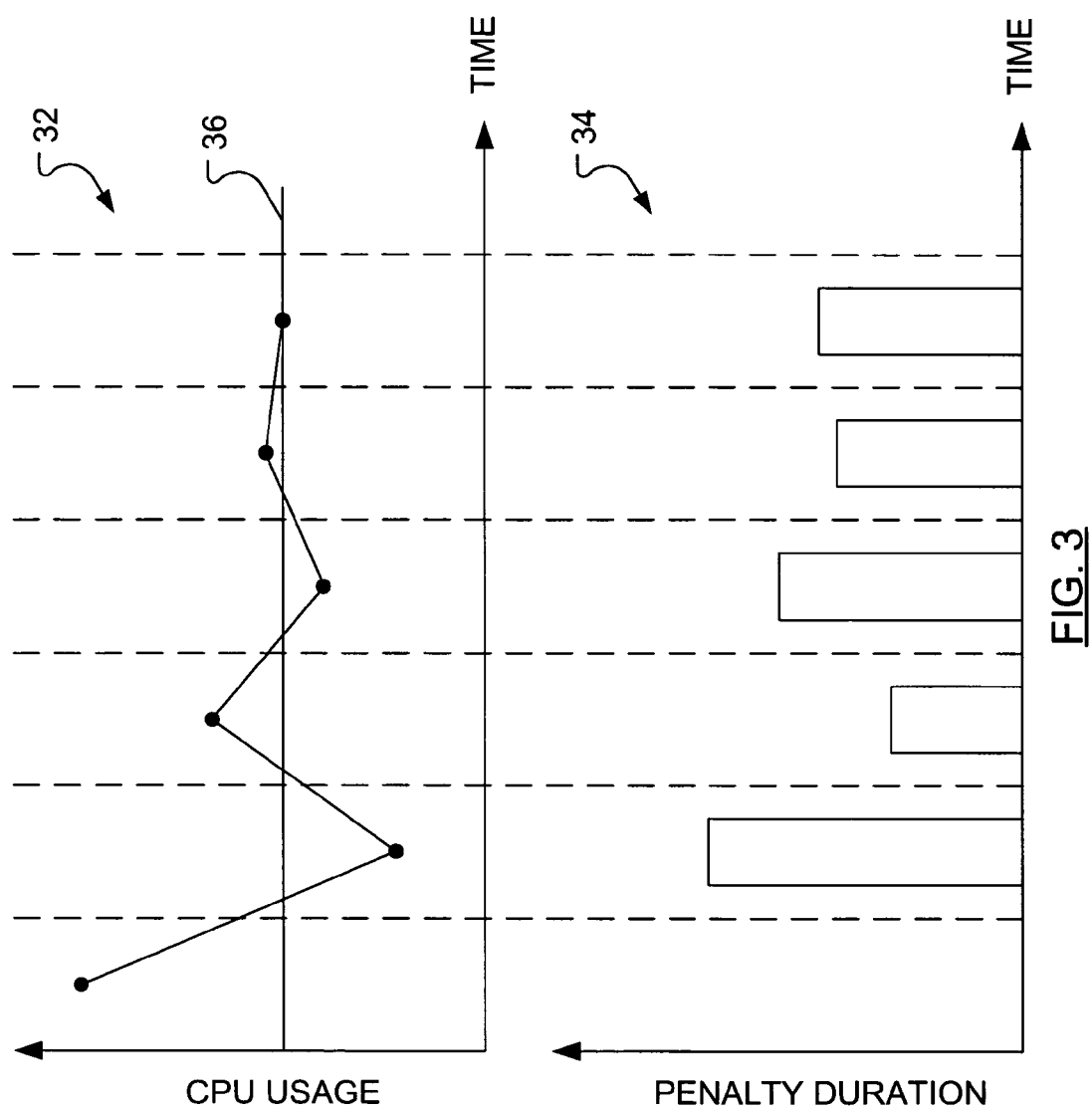
FIG. 3 illustrates related graphs of CPU usage vs. time and penalty duration vs. time.

In subsequent evaluation intervals, the penalty duration may be adjusted to achieve convergence of the actual CPU usage to the absolute target CPU usage. An example of such convergence is illustrated graphically in FIG. 3. In a first plot 32, a CPU usage measurement is plotted for each of a series of evaluation intervals. In a related bar graph 34, the height of each bar is representative of length of penalty duration. The first plot includes an indication 36 of a target CPU usage. Note that the penalty duration itself is not proportional to the difference between the actual CPU usage and the target CPU usage, in which case a relatively small difference would lead to a relatively short penalty duration. Instead, the change (or delta) in the penalty duration is proportional to the difference between the actual CPU usage and the target CPU usage, in which case a relatively small difference leads to a relatively small difference between one penalty duration and the subsequent penalty duration.

Figure 4:
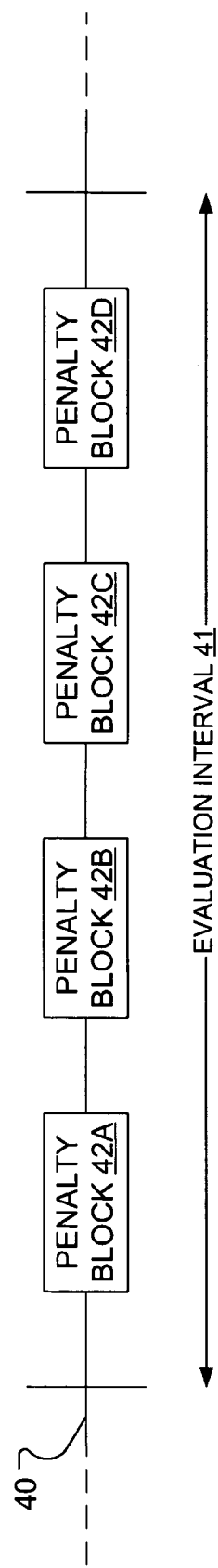
FIG. 4 illustrates an alternative manner of applying a penalty.

If a penalty applied to a given task is served continuously, then both the maximum and average scheduling latencies (time required for task to complete) of the task are equal to the length of the penalty duration. However, if the penalty is applied throughout the evaluation interval in equally sized units, then both the maximum and average scheduling latencies of the given task may be seen to drop dramatically. Therefore, rather than issuing a given task a single continuous penalty during each evaluation interval, the penalty duration may be split into several (approximately) equally sized penalty blocks to be applied non-contiguously. A time line 40 is illustrated in FIG. 4 as having an evaluation interval 41. A penalty may then be applied to the given task during each of a plurality of penalty blocks 42A, 42B, 42C, 42D. The total duration of the plurality of penalty blocks 42A, 42B, 42C, 42D is preferably equivalent to the penalty duration determined based on the actual CPU usage measured during the evaluation interval directly preceding the evaluation interval 41.

Although the CPU usage targets for each task are independent, the actual CPU usage of each task often depends upon the CPU usage patterns of the other tasks in the system, the penalties for each task may be adjusted to compensate.

Tasks may be grouped into classes and the actual usage may be determined for an entire class rather than for a single task. The actual CPU usage for the class is then compared to target CPU usage for the class when determining a penalty for the class. Furthermore, within classes, tasks within a top-level class may be grouped into sub-classes, where a weight is associated with a sub-class to assist in determining a portion of the target CPU usage of the top-level class to associate with the sub-class Thus far, we have described a scheduling algorithm that acts to monitor and, if necessary, penalize individual tasks. Notably, in an alternative implementation, tasks with a common purpose may be grouped into a "class". The actual CPU usage is determined for all of the tasks in a particular class, compared to a target CPU usage for the particular class and, if necessary, a penalty may assessed against all of the tasks in the particular class, i.e., the priority of each task may be reduced for the penalty duration.

Figure 5:
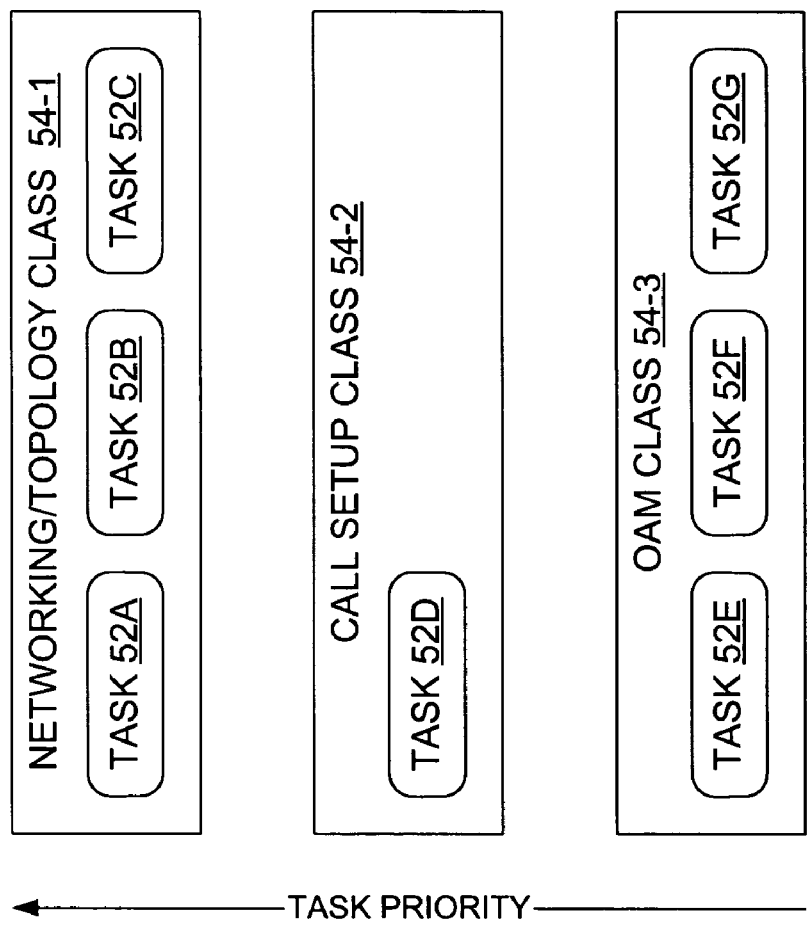
FIG. 5 illustrates a number of tasks organized by class in accordance with an embodiment of the present invention.

FIG. 5 illustrates a number of tasks organized by class, where the classes are arranged by priority. In particular, a networking/topology class 54-1 includes three high priority tasks 52A, 52B, 52C. Networking/topology may be considered to be both urgent and important. Routing protocols need to react quickly to network topology changes in order to re-build a view of a recently changed network. A call setup class 54-2 includes a medium priority task 54D. Call setup may be considered to be slightly less urgent and slightly mote important than networking/topology in the sense that calls provide revenue. An operation, administration and maintenance (OAM) class 54-3 includes three low priority tasks 52D, 52E, 52G. OAM may be considered to be much less urgent than networking/topology, yet may be considered to be important in the sense that some non-zero amount of CPU must be guaranteed.

When the penalty duration of a class is of the order of the size of the evaluation interval, the actual CPU usage of the class may be seen to fluctuate wildly, high in one evaluation interval and very low in the next. This causes the penalty assessed to the class to fluctuate in a similar manner, since the penalty is constantly re-evaluated based upon the difference between the target CPU usage and actual CPU usage.

One solution to this problem is to increase the size of the evaluation interval such that the evaluation interval is longer than the largest penalty duration of any of the classes. That is, the evaluation interval must be large enough such that the evaluation interval includes both some non-penalized time for each class. However, an increased evaluation interval causes the convergence times to increase for each class, since the penalty values are only re-evaluated at the end of each evaluation interval.

Another solution to this problem is to use averaging to minimize the impact of fluctuations in CPU usage. Instead of comparing the actual CPU usage of the last evaluation interval to the target CPU usage, an average CPU usage of the last n evaluation intervals may be determined and compared to the target CPU usage, lessening the susceptibility of the model to CPU usage fluctuations. Further stability can be achieved by computing the penalty duration as the average of the last n penalty durations.

Another problem associated with the use of classes occurs when tasks in the highest priority class are inactive. Consider a scenario wherein the target CPU usage for the networking/topology-class 54-1 is 40%, the target CPU usage for the call setup class 54-2 is 50% and the target CPU usage for the OAM class 54-3 is 10%. If, while the tasks of the networking/topology class 54-1 are inactive, tasks of both the call setup class 54-2 and the OAM class 54-3 have a large load, then, at a steady state, the following CPU usage occurs: the tasks of the call setup class 54-2 receive 50% CPU usage; and the tasks of the OAM class 54-3 receive 10% CPU. The remaining 40% CPU usage is shared between the tasks of the call setup class 54-2 and the tasks of the OAM class 54-3 in a round robin manner at a very low priority. The "very low priority" is a result of a penalty being served when the CPU usage of the tasks of the call setup class 54-2 and the tasks of the OAM class 54-3 exceeds respective CPU usage targets, because there is now more CPU usage available in the system (since some tasks are not demanding CPU usage).

As a result, the tasks of the call setup class 54-2 and the tasks of the OAM class 54-3 each receive an additional 20% CPU usage (i.e., half of the remaining 40% CPU usage).

However, it would be much preferred that the tasks of the call setup class 54-2 (the revenue generating class) receive most, if not all, of the remaining 40% CPU usage. This may be accomplished in a number of ways. For example, the round robin sharing of the remaining 40% CPU usage may be weighted such that tasks of the call setup class 54-2 receive more of the remaining 40% CPU usage than the tasks of the OAM class 54-3. Unfortunately, this solution may result in poor latency performance for tasks of the call setup class 54-2 since ⅘ of the CPU usage is received at a very low task priority.

In contrast, a "hierarchical" scheduling design may be used to control distribution of that CPU usage which is unused by idle/unloaded classes. Additionally, the CPU usage remaining from superior-level classes that is distributed to tasks of inferior-level classes may be received at the natural priority of the individual tasks.

Figure 6:
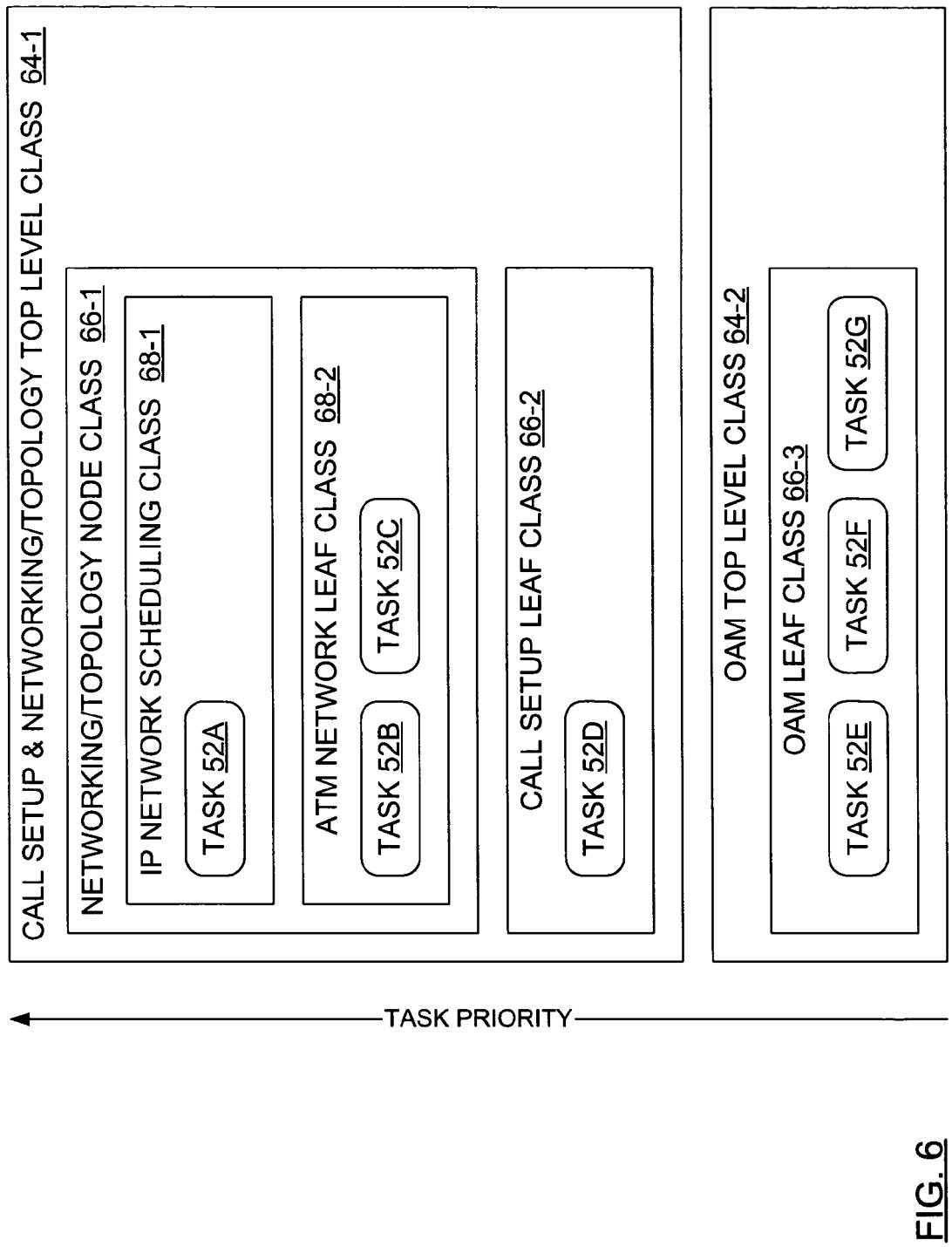
FIG. 6 illustrates the tasks of FIG. 5 arranged for in a hierarchical scheduling design according to an embodiment of the present invention.

FIG. 6 illustrates the tasks of FIG. 5 arranged for a hierarchical scheduling design. Two top level classes, namely a call setup and networking/topology top level class 64-1 and a OAM top level class 64-2, each include sub-classes. In particular, the sub-classes of the call setup and networking/topology top level class 64-1 include a networking/topology node class 66-1 and a call setup leaf class 66-2, while the sub-classes of the OAM top level class 64-2 include an OAM leaf class 66-3. The OAM leaf class 66-3 includes the tasks 52E, 52F, 52G of the OAM class 54-3 of FIG. 5. The call setup leaf class 66-2 includes the task 52D of the call setup class 54-2 of FIG. 5. The networking/topology node class 66-1 includes two sub-classes, namely an IP networking scheduling class 68-1 and an ATM networking leaf class 68-2. The IP networking scheduling class 68-1 includes a task 54A among the tasks of the networking/topology class 54-1 of FIG. 5 while the ATM networking leaf class 68-2 includes the remaining two tasks 52B, 52C of the networking/topology class 54-1 of FIG. 5.

Each of the two top level classes 64-1, 64-2 have pre-assigned target CPU usage, expressed as a percentage of total available CPU usage. Each of the sub-classes have pre-assigned CPU weights for determining a relative share of the target CPU usage of the parent class.

In the following examples, consider that the tasks 52E, 52F, 52G of the OAM leaf class 66-3 are over loaded and have reached a steady state. Additionally, consider that call setup and networking/topology top level class 64-1 is assigned a target CPU usage of 90% and the OAM top level class 64-2 is assigned a target CPU usage of 10%. As well, the weight of the call setup leaf class 66-2 is 5 and the sibling networking/topology node class 66-1 is assigned a weight of 4. Such a weighting results in a effective target CPU usage split of 50%-40%, as was the case in the arrangement of FIG. 5. Furthermore, the IP networking scheduling class 68-1 is assigned a weight of 1 and the ATM networking leaf class 68-2 is assigned a weight of 2.

In a first example, tasks of the call setup leaf class 66-2 are loaded and the tasks of the call setup leaf class 66-2 have an effective target CPU usage of 90%. Additionally, the over loaded tasks 52E, 52F, 52G of the OAM leaf class 66-3 are maintained at an effective target CPU usage of 10%. Notably, the remaining tasks are not loaded.

In a second example, tasks of the call setup leaf class 66-2 are loaded along with tasks of the IP networking scheduling class 68-1. The tasks of the call setup leaf class 66-2 have an effective target CPU usage of 50% (since the call setup leaf class 66-2 is assigned a weight of 5), the tasks of the IP networking scheduling class 68-1 have an effective target CPU usage of 40% (since the IP networking scheduling class 68-1 is assigned a weight of 4) and the tasks 52E, 52F, 52G of the OAM leaf class 66-3 have an effective target CPU usage of 10%.

In a third example, tasks of the call setup leaf class 66-2 are loaded along with tasks of the IP networking scheduling class 68-1 and the ATM networking leaf class 68-2. The tasks of the call setup leaf class 66-2 have an effective target CPU usage of 50%, the tasks 52B, 52C of the ATM networking leaf class 68-2 have an effective target CPU usage of 26%, the single task 52A of the IP networking scheduling class 68-1 has an effective target CPU usage of 13% and the tasks 52E, 52F, 52G of the OAM leaf class 66-3 have an effective target CPU usage of 10%.

Notably, the relative weights assigned to the IP networking scheduling class 68-1 (weight=1) and the ATM networking leaf class 68-2 is (weight=2) may be related to the number of tasks in the classes or may be assigned using an entirely unrelated criterion.

In a fourth example, tasks of the IP networking scheduling class 68-1 are loaded along with tasks of the ATM networking leaf class 68-2. The tasks of the ATM networking leaf class 68-2 have an effective target CPU usage of 60%, the tasks of the IP networking scheduling class 68-1 have an effective target CPU usage of 30% and the tasks 52E, 52F, 52G of the OAM leaf class 66-3 have an effective target CPU usage of 10%.

As should become clear from the above examples, determining a target CPU usage for a given task requires the formation of a quotient by dividing the weight associated with the sub-class of which the given task is a part by a sum of weights associated with all of the sub-classes directly associated with the parent class of which the given sub-class is a part. Determining the target CPU usage for the given task then requires multiplying the target CPU usage associated with the parent class by the quotient.

Advantageously, it may be seen that use of a scheduling hierarchy, such as described herein, can lead to better CPU usage distribution and better latency performance.

Figure 7:
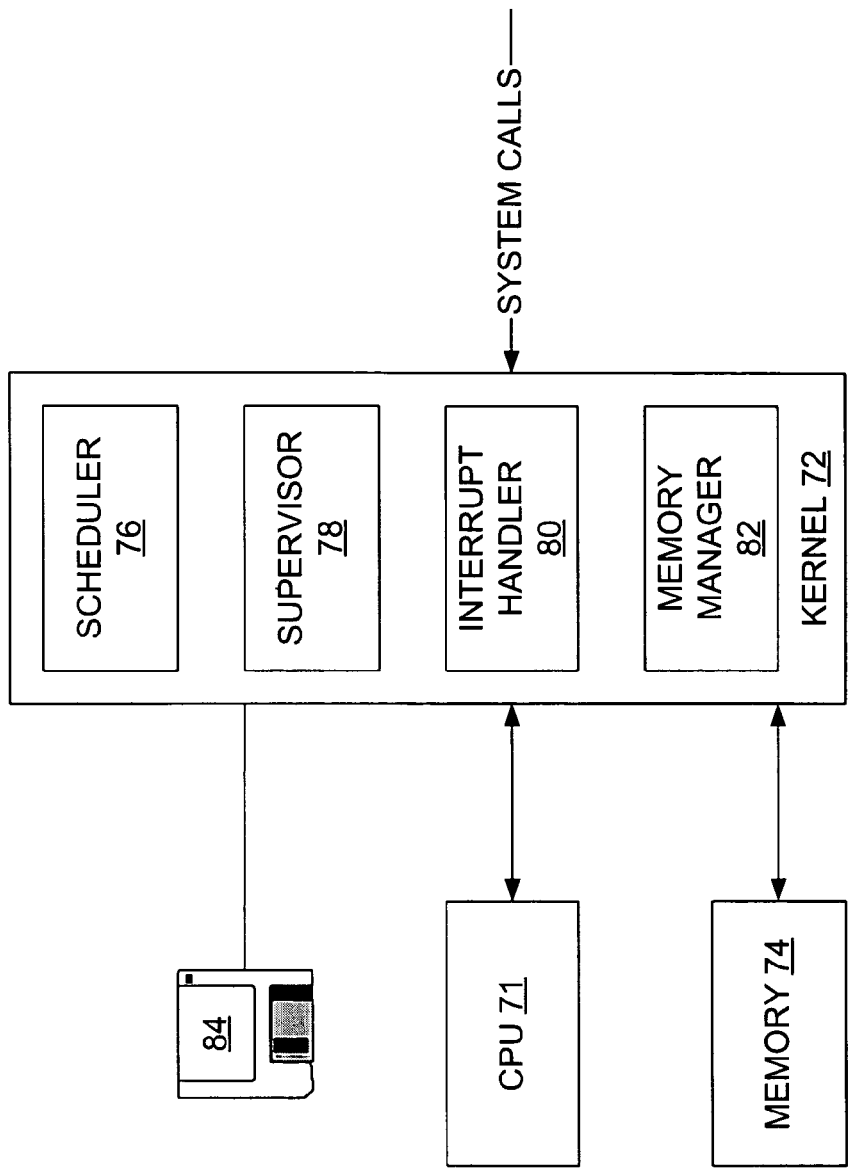
FIG. 7 illustrates a computing environment in which methods exemplary of the present invention may be carried out.

FIG. 7 illustrates a computing environment 70 in which methods exemplary of the present invention may be carried out. As described hereinbefore, it is typical for a kernel 72 (or any comparable center of an operating system) to comprise programming code that runs on a CPU 71 and to include an interrupt handler 80 that handles all requests or completed input/output (I/O) operations that compete for the kernel's services, a scheduler 76 that, by carrying out a method exemplary of this invention, determines which programs use CPU processing time and an order of use, and a supervisor 78 that allows usage of the CPU to each task when the task is scheduled. The kernel 72 may also include a memory manager 82 adapted to manage operating system address spaces in a memory 74, sharing the address spaces among all components and other users of the services of the kernel 72.

The kernel 72 may be loaded with scheduling methods exemplary of this invention from a software medium 84, for example, a computer redeable medium, which could be a disk, a tape, a chip or a random access memory containing a file downloaded from a remote source.

Other modifications will be apparent to those skilled in the art and, therefore, the invention is defined in the claims.

We claim:

1. A method of calculating central processing unit (CPU) usage by a given task, the method comprising the steps of:
   associating the given task with a top level class and a sub-class, the sub-class being one of a plurality of sub-classes directly associated with a parent class; and
   determining a target CPU usage for the given task from a weight associated with the sub-class representing a relative share of a target CPU usage associated with the parent class and a target CPU usage associated with the top level class;
   wherein the step of determining the target CPU usage for the given task comprises the steps of:
   forming a quotient by dividing the weight associated with the sub-class by a sum of weights associated with the plurality of sub-classes directly associated with the parent class; and
   multiplying the target CPU usage associated with the parent class by the quotient.

2. The method of claim 1 further comprising:
   determining an actual usage of said CPU by said given task in a first predetermined evaluation interval;
   determining a penalty duration for said given task based on said actual usage and said target CPU usage for said given task; and
   applying a penalty to said given task for said penalty duration during a second predetermined evaluation interval.

3. The method of claim 2 wherein said applying said penalty comprises demoting a scheduling priority associated with said given task.

4. The method of claim 2 wherein said penalty is applied continuously for said penalty duration.

5. The method of claim 2 wherein said penalty is applied during a plurality of periods over said second predetermined evaluation interval, such that a total duration of application of said penalty is equivalent to said penalty duration.

6. The method of claim 2 wherein said actual usage of said CPU by said given task in said first predetermined evaluation interval is a first actual usage and said penalty duration based on said first actual usage is a first penalty duration, said method further comprising:
   determining a second actual usage of said CPU by said given task in said second predetermined evaluation interval;
   determining a second penalty duration for said given task based on said second actual usage and said target CPU usage for said given task; and
   applying said penalty to said given task for said second penalty duration during a third predetermined evaluation interval.

7. The method of claim 1, wherein the top level class is the parent class of the sub-class.

8. The method of claim 1, wherein a further sub-class of the top level class is the parent class of the sub-class.

9. A scheduler for execution in a kernel of a central processing unit (CPU), the scheduler containing data and instructions stored in a computer readable medium to enable tasks to be scheduled for execution by the kernel, the data and instructions allowing the scheduler to perform a method comprising the steps of:
   associating a given task with a top level class and a sub-class, the sub-class being one of a plurality of sub-classes directly associated with a parent class; and
   determining a target CPU usage for the given task from a weight associated with the sub-class representing a relative share of a target CPU usage associated with the parent class and a target CPU usage associated with the top level class;
   wherein the step of determining the target CPU usage for the given task comprises the steps of:
   forming a quotient by dividing the weight associated with the sub-class by a sum of weights associated with the plurality of sub-classes directly associated with the parent class; and
   multiplying the target CPU usage associated with the parent class by the quotient.

10. The scheduler of claim 9, wherein the method further comprises the steps of:
    determining an actual usage of the CPU by the given task in a first predetermined evaluation interval;
    determining a penalty duration for the given task based on the actual usage and the target CPU usage for the given task; and
    applying a penalty to the given task for the penalty duration during a second predetermined evaluation interval.

11. The scheduler of claim 10, wherein the step of applying the penalty comprises demoting a scheduling priority associated with the given task.

12. The scheduler of claim 10, wherein the penalty is applied continuously for the penalty duration.

13. The scheduler of claim 10, wherein the penalty is applied during a plurality of periods over the second predetermined evaluation interval, such that a total duration of application of the penalty is equivalent to the penalty duration.

14. The scheduler of claim 10, wherein the actual usage of the CPU by the given task in the first predetermined evaluation interval is a first actual usage and the penalty duration based on the first actual usage is a first penalty duration, the method further comprising the steps of:
    determining a second actual usage of the CPU by the given task in the second predetermined evaluation interval;
    determining a second penalty duration for the given task based on the second actual usage and the target CPU usage for the given task; and
    applying the penalty to the given task for the second penalty duration during a third predetermined evaluation interval.

15. A computer readable medium containing computer-executable instructions that, when performed by an apparatus for calculating usage of a central processing unit (CPU) in a kernel, cause the apparatus to:
    associate a given task with a top level class and a sub-class, the sub-class being one of a plurality of sub-classes directly associated with a parent class; and
    determine a target CPU usage for the given task from a weight associated with the sub-class representing a relative share of a target CPU usage associated with the parent class and a target CPU usage associated with the top level class;
    wherein the step of determining the target CPU usage for the given task comprises the steps of:
    forming a quotient by dividing the weight associated with the sub-class by a sum of weights associated with the plurality of sub-classes directly associated with the parent class; and
    multiplying the target CPU usage associated with the parent class by the quotient.

16. The computer readable medium of claim 15, further containing computer-executable instructions that, when performed by the apparatus for calculating usage of the central processing unit (CPU) in the kernel, further cause the apparatus to:
    determine an actual usage of the CPU by the given task in a first predetermined evaluation interval;
    determine a penalty duration for the given task based on the actual usage and the target CPU usage for the given task; and
    apply a penalty to the given task for the penalty duration during a second predetermined evaluation interval.

17. The computer readable medium of claim 16, wherein applying the penalty comprises demoting a scheduling priority associated with the given task.

18. The computer readable medium of claim 16, wherein the penalty is applied continuously for the penalty duration.

19. The computer readable medium of claim 16, wherein the penalty is applied during a plurality of periods over the second predetermined evaluation interval, such that a total duration of application of the penalty is equivalent to the penalty duration.

20. The computer readable medium of claim 16, wherein the actual usage of the CPU by the given task in the first predetermined evaluation interval is a first actual usage and the penalty duration based on the first actual usage is a first penalty duration, the computer readable medium further containing computer-executable instructions that, when performed by the apparatus for calculating usage of the central processing unit (CPU) in the kernel, further cause the apparatus to
    determine a second actual usage of the CPU by the given task in the second predetermined evaluation interval;
    determine a second penalty duration for the given task based on the second actual usage and the target CPU usage for the given task; and
    apply the penalty to the given task for the second penalty duration during a third predetermined evaluation interval.

* * * * *